US010929556B1

(12) United States Patent
Kurian

(10) Patent No.: US 10,929,556 B1
(45) Date of Patent: Feb. 23, 2021

(54) DISCRETE DATA MASKING SECURITY SYSTEM

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 423 days.

(21) Appl. No.: 15/962,786

(22) Filed: Apr. 25, 2018

(51) Int. Cl.
G06F 21/62 (2013.01)
G06F 3/06 (2006.01)
G06F 16/23 (2019.01)

(52) U.S. Cl.
CPC .......... G06F 21/6227 (2013.01); G06F 3/064 (2013.01); G06F 3/0622 (2013.01); G06F 3/0623 (2013.01); G06F 3/0673 (2013.01); G06F 16/2365 (2019.01); G06F 21/6254 (2013.01)

(58) Field of Classification Search
CPC .................... G06F 21/6254; G06F 21/6227
See application file for complete search history.

(56) References Cited

U.S. PATENT DOCUMENTS

| 7,146,377 | B2 | 12/2006 | Nowicki et al. |
| 7,152,165 | B1 | 12/2006 | Maheshwari et al. |
| 7,506,157 | B2 | 3/2009 | Carpentier et al. |
| 8,074,289 | B1 | 12/2011 | Carpentier et al. |
| 8,108,912 | B2 | 1/2012 | Ferris |
| 8,219,823 | B2 | 7/2012 | Carter |
| 8,271,974 | B2 | 9/2012 | Mazhar et al. |
| 8,606,878 | B2 | 12/2013 | Ferris |
| 8,910,278 | B2 | 12/2014 | Davne et al. |
| 8,984,610 | B2 | 3/2015 | Spiers et al. |
| 9,043,751 | B2 | 5/2015 | Mazhar et al. |
| 9,069,599 | B2 | 6/2015 | Martinez et al. |
| 9,209,979 | B2 | 12/2015 | Spiers et al. |
| 9,317,577 | B2 | 4/2016 | Duan et al. |
| 9,444,819 | B2 | 9/2016 | Muppidi et al. |
| 9,462,013 | B1 | 10/2016 | Boss et al. |
| 9,634,990 | B2 | 4/2017 | Lee |
| 9,692,632 | B2 | 6/2017 | Bhattacharya et al. |
| 9,729,622 | B2 | 8/2017 | Ferris |
| 10,540,524 | B2 | 1/2020 | Dementiev et al. |
| 2002/0029263 | A1 | 3/2002 | Toyoshima et al. |

(Continued)

Primary Examiner — Scott A. Waldron
(74) Attorney, Agent, or Firm — Michael A. Springs; Moore & Van Allen PLLC; Jeffrey R. Gray

(57) ABSTRACT

The invention relates generally to improved secure data storage that utilizes zoned data storage and control and/or integration of discrete data for masking the stored data. The data may be divided and stored in different zoned databases and assigned different access rights in order to separate data that is part of a larger combination of data into smaller data portions, which makes it difficult for unauthorized use of such data. Additionally, or alternatively, data that is stored within a database may be combined with other discrete data (e.g., unrelated real data) in order to mask the data being stored. As such, the masked data is more secure and less storage spaces is required due to the utilization of real data for masking. When an unauthorized requestor of the stored data is identified deterrence actions may be taken to reduce the unauthorized user's ability to access the desired data.

20 Claims, 4 Drawing Sheets

(56) References Cited

U.S. PATENT DOCUMENTS

| | | |
|---|---|---|
| 2002/0157021 A1 | 10/2002 | Sorkin et al. |
| 2005/0027719 A1 | 2/2005 | Maciel et al. |
| 2005/0039001 A1 | 2/2005 | Hudis et al. |
| 2005/0076237 A1 | 4/2005 | Cohen et al. |
| 2005/0080827 A1 | 4/2005 | Percival et al. |
| 2006/0070124 A1 | 3/2006 | Arndt et al. |
| 2007/0086060 A1 | 4/2007 | Chiba et al. |
| 2007/0300031 A1 | 12/2007 | Jevans et al. |
| 2009/0276477 A1 | 11/2009 | Thuringer et al. |
| 2010/0125730 A1 | 5/2010 | Dodgson et al. |
| 2012/0169457 A1 | 7/2012 | Williamson |
| 2013/0007845 A1 | 1/2013 | Chang et al. |
| 2014/0149460 A1 | 5/2014 | Thuringer et al. |
| 2016/0012222 A1 | 1/2016 | Stolfo et al. |
| 2016/0162693 A1 | 6/2016 | Breuer et al. |
| 2016/0277444 A1 | 9/2016 | Keromytis et al. |
| 2017/0132280 A1 | 5/2017 | Li et al. |
| 2019/0289034 A1 * | 9/2019 | Erez .................. H04L 67/10 |

* cited by examiner

DISCRETE DATA MASKING SECURITY SYSTEM

FIELD

The present invention relates to security systems for data storage, and more particularly data storage systems that utilize zoned storage and control and/or discrete data integration to provide additional security for deterring unauthorized utilization of data.

BACKGROUND

Organization's institute systems and procedures for handling unauthorized users and/or unauthorized access requests. These systems and procedures are tailored to identify potential unauthorized users and/or unauthorized requests. However, improved systems and procedures for deterring potential unauthorized users and/or unauthorized requests are needed.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved secure data storage that utilizes zoned data storage and control and/or integration of discrete data for masking the stored data. For example, the data may be divided and stored in different zoned databases in order to store the data in smaller data portions, which makes it difficult for unauthorized use of such data because the zoned databases have different access rights. Different database administrators manage the different zoned databases and different users have access to the different zoned databases, and as such single users and/or system do not have access to all of the combined data stored in the zoned databases, as will be discussed in further detail herein.

Additionally, or alternatively, in some embodiments, data that is stored within a database may be combined with other discrete data (e.g., unrelated data) in order to mask the data being stored. In some embodiments, instead of creating and storing "fake" data (e.g., data that does not have any significance to the organization), which would take up data storage capacity, data storage space may be saved by integrating two or more discrete data set, all of which have significance, together in order to mask both sets of data. It should be understood that the two or more discrete data sets are not related in any way (e.g., each data set is used by different parts of the organization for different reasons). Utilizing discrete data sets that are integrated masks the original data sets and makes it difficult for unauthorized users to identify the discrete data in which the unauthorized user is interested. Moreover, the masked data may be stored in a first zoned database, while the means for separating the integrated data is stored in a second zoned database.

Embodiments of the invention comprise systems, computer implemented methods, and computer program products for a security system for masking data through integration of discrete data. The invention comprises identifying two or more discrete data sets, wherein the two or more discrete data sets comprise at least first data and second data, wherein the first data is unrelated to the second data. The invention further comprises applying an integrator to combine the two or more discrete data sets into masked data, wherein the two or more discrete data sets within the masked data have a data type that is the same, and storing the masked data in a masked database.

In other embodiments the invention further comprises storing the integrator in an integrator database, wherein the masked database and the integrator database are zoned databases with independent access rights. In still other embodiments the invention further comprises storing a separator in a separator database, and wherein the separator database is included in the zoned databases.

In yet other embodiments the invention further comprises receiving a request from a requestor to access the data from the masked data in the masked database, determining authentication for the requestor to access the data, and determining the requestor is an unauthorized requestor.

In further accord with embodiments of the invention, the zoned databases are operatively coupled to each other, and the invention further comprises repealing access to one or more zoned databases from the zoned databases that are operatively coupled to the masked database when the requestor is determined to be the unauthorized requestor.

In other embodiments of the invention, the zoned databases are operatively coupled to each other, and the invention further comprises directing the requestor to a continuous loop to prevent the requestor from accessing other zoned databases within the zoned databases when the requestor is determined to be the unauthorized requestor.

In still other embodiments of invention, the zoned databases are operatively coupled to each other, and the invention further comprises identifying imitation data and presenting the imitation data to the unauthorized requestor instead of the data from the masked data when the requestor is determined to be the unauthorized requestor. In yet other embodiments of the invention, the imitation data is presented within one or more imitation databases.

In yet other embodiments the invention further comprises receiving a request from a requestor to access the data from the masked data in the masked database, determining authentication for the requestor to access the data, and determining the requestor is an authorized requestor. The invention further comprises accessing the masked data from the masked database, accessing the separator from the separator database, and applying the separator to the masked data to identify the two or more discrete data sets. The invention also comprises determining the data from the two or more discrete data sets, and providing the data to the requestor.

In other embodiments the invention further comprises encoding the two or more discrete data sets before applying the integrator to the masked data or after applying the integrator to the masked data in order to encode the masked data.

In further accord with embodiments of the invention, the first data is a first data type and the second data is a second data type, and wherein the invention further comprises converting the second data from the second data type to the first data type before applying the integrator to the two or more discrete data sets.

In other embodiments of the invention, the first data type is a first character string of a first length, wherein the second data type is a second character string of a second length, wherein the second length of the second character string is converted to the first length.

In still other embodiments of the invention, the masked data is unusable without the separator for separating the masked data into the two or more discrete data sets, which requires an unauthorized user to gain separate access to the zoned databases.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
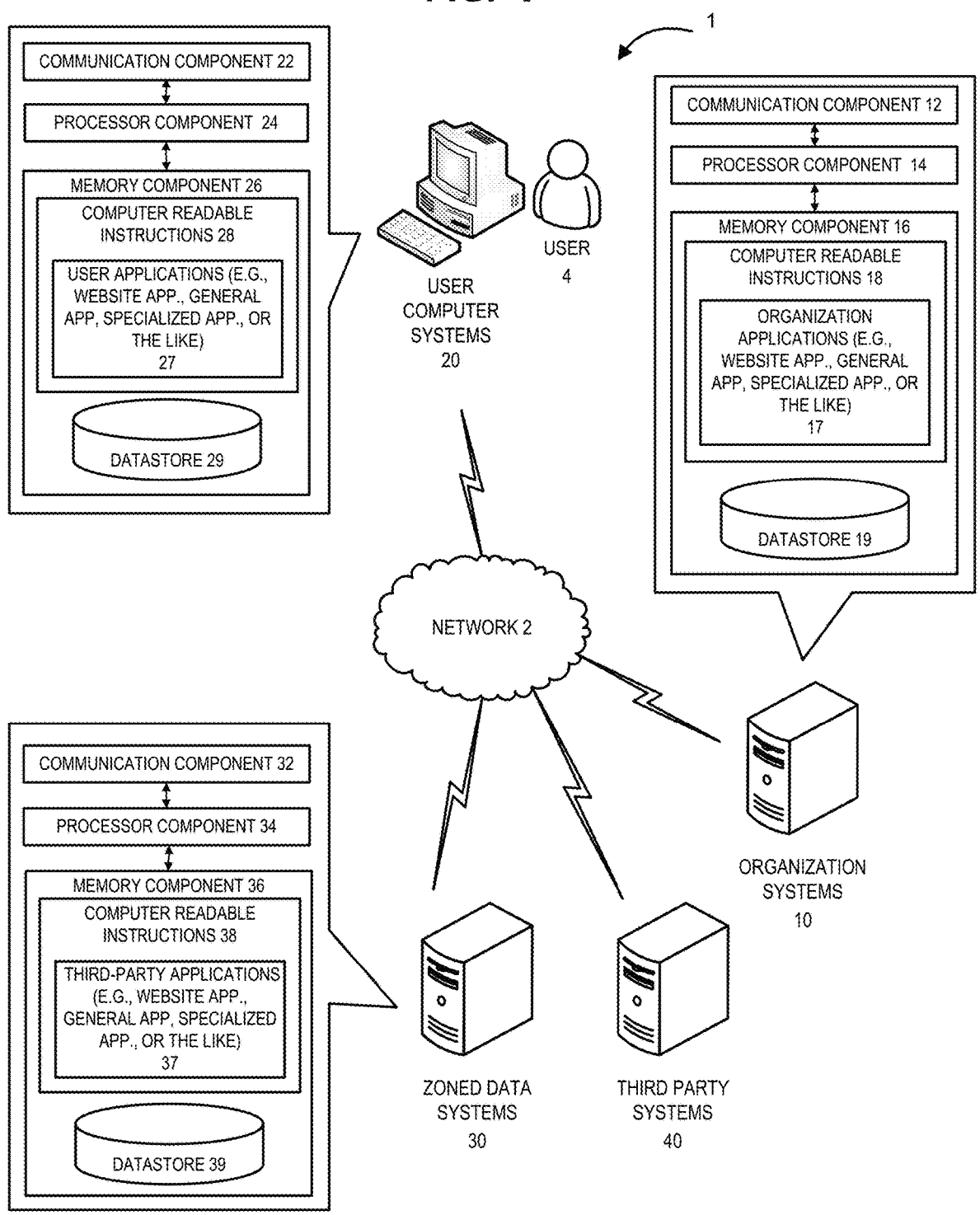

Having thus described embodiments of the invention in general terms, reference will now be made to the accompanying drawings, and wherein:

FIG. 1 illustrates a block diagram of a secure data storage system environment, in accordance with one or more embodiments of the invention.

Figure 2:
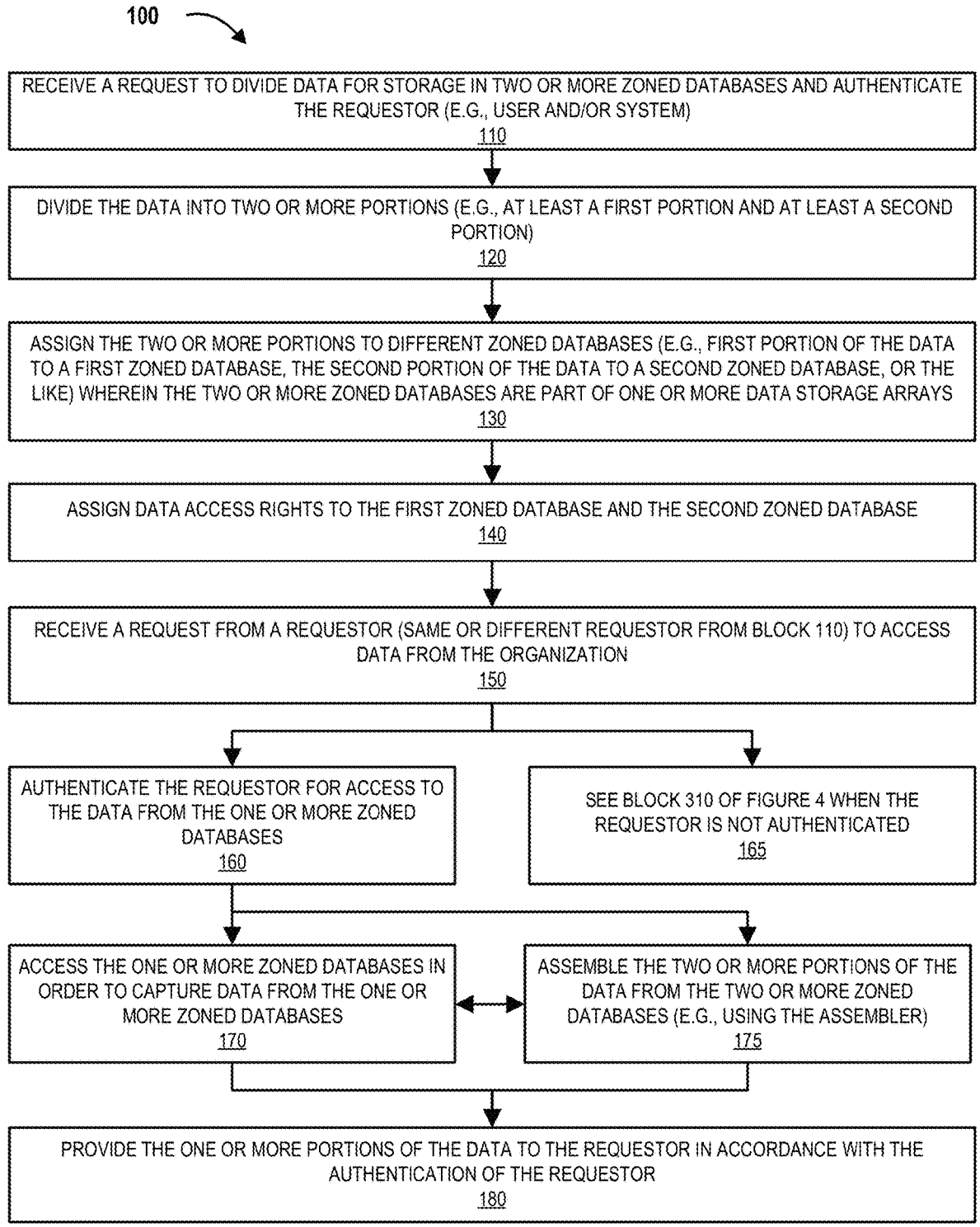

FIG. 2 illustrates a process flow for utilizing and controlling zoned databases to improve security, in accordance with one or more embodiments of the invention.

Figure 3:
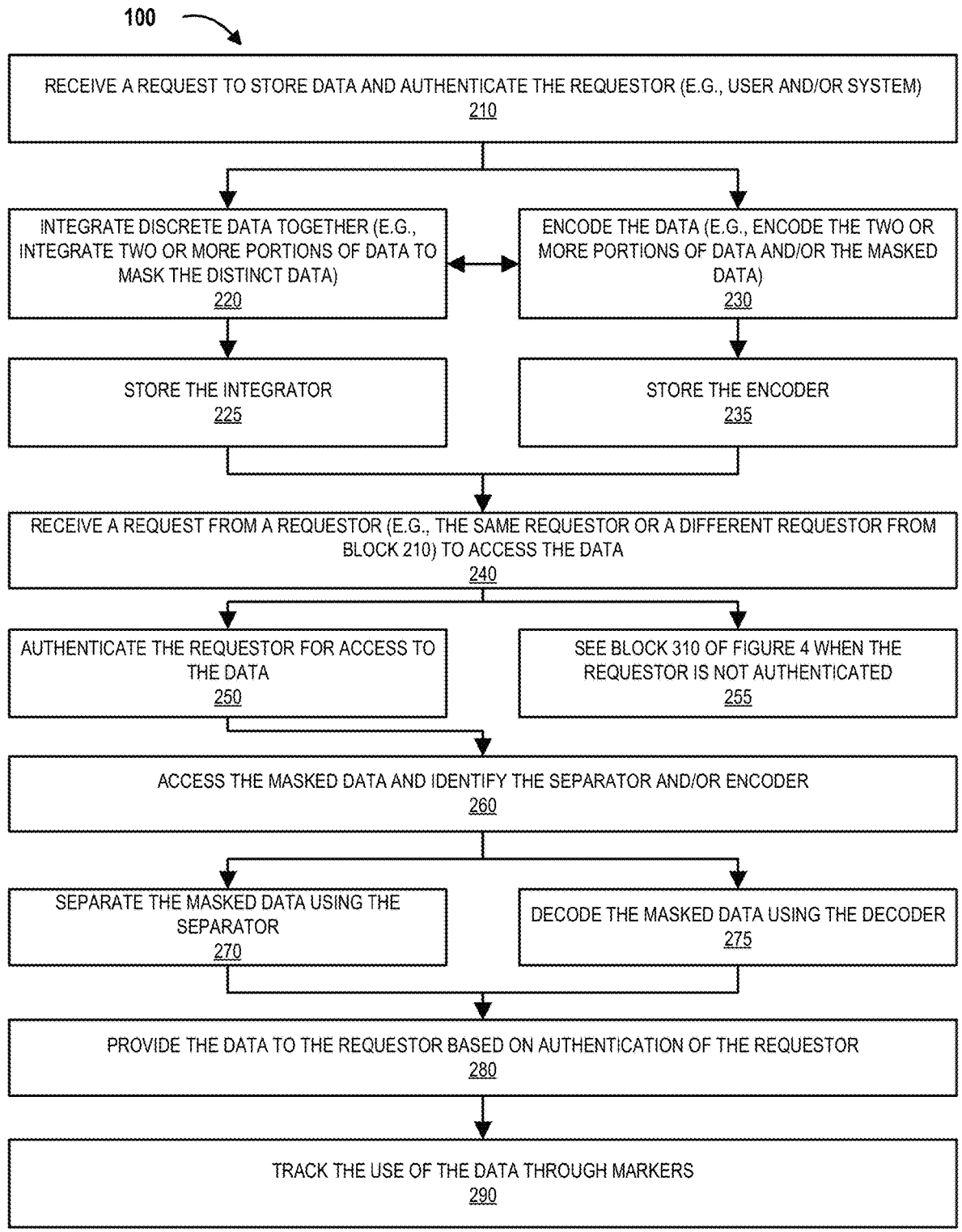

FIG. 3 illustrates a process flow for masking data and/or encoding the data to improve security, in accordance with one or more embodiments of the invention.

Figure 4:
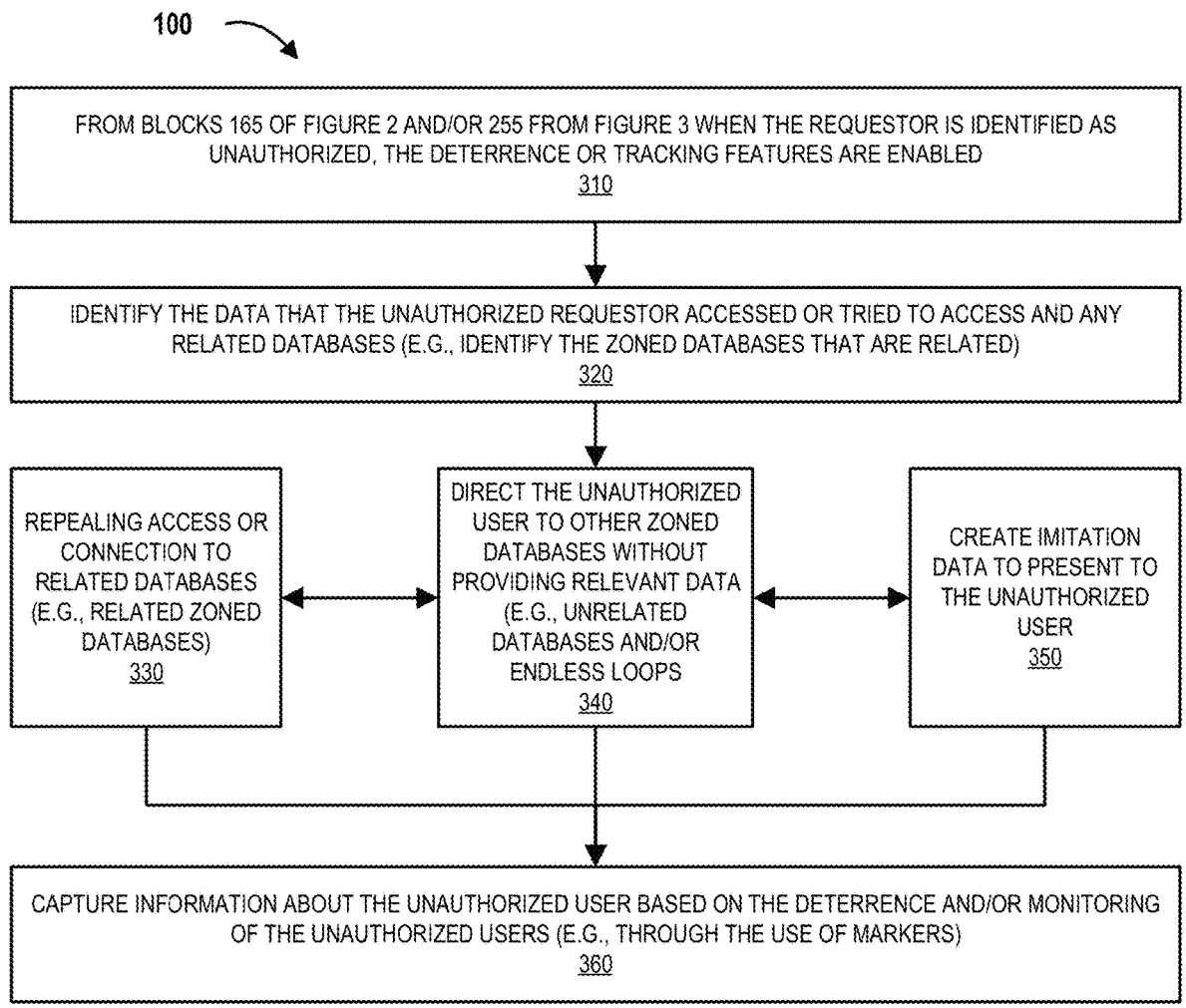

FIG. 4 illustrates a process flow for deterring unauthorized users and/or requests to improve security, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for improved secure data storage that utilizes zoned data storage and control and/or integration of discrete data for masking the stored data. For example, the data may be divided and stored in different zoned databases in order to store the data in smaller data portions, which makes it difficult for unauthorized use of such data because each zoned database may have different access rights (e.g., database administrators, users, and systems do not have access to all of the zoned databases that store the data portions of the larger data set). Additionally, or alternatively, data that is stored within a database may be combined with other discrete data (e.g., unrelated data) in order to mask the data being stored. As such, instead of creating and storing "fake" data (e.g., data that does not have any significance to the organization), which would take up data storage capacity, data storage space may be saved by integrating two or more discrete data set, all of which have significance, together in order to mask both sets of data. It should be understood that the two or more discrete data sets are not related in any way (e.g., each data set is used by different parts of the organization for different reasons). Utilizing discrete data sets that are integrated masks the original data sets and makes it difficult for unauthorized users to identify the discrete data in which the unauthorized user may be interested. Moreover, the masked data may be stored in a first zoned database, while the means for separating the integrated data may be stored in a second zoned database.

FIG. 1 illustrates a zoned database system environment 1, in accordance with embodiments of the invention. As illustrated in FIG. 1, one or more organization systems 10 are operatively coupled, via a network 2, to one or more user computer systems 20 (e.g., authorized user systems and/or unauthorized user systems), one or more zoned data system 30, one or more third party systems 40, and/or one or more other systems (not illustrated). In this way, the one or more organization systems 10 may receive communications, including authentication credentials, or the like, from a requestor (e.g., a user 4 and/or other systems making a request) and thereafter utilize the systems and processes described herein to store data securely, control access by various requestors, and/or deterring unauthorized requestors from accessing data. It should be understood that the users 4 may be one or more associates, employees, agents, contractors, sub-contractors, third-party representatives, customers, or the like, and the systems may be the user computer systems 20, third-party systems 30, or other systems. It should be understood that the requestor may be the original requestor of data and/or an intermediary that receives the original request and accesses the various databases to access the data requested. It should be further understood that a requestor may be an authorized requestor (e.g., authorized user or system that is able to access data), or an unauthorized requestor (e.g., unauthorized user or system that has misappropriated authentication credentials of authorized requestors and/or authorized requestors that have taken data with the intent to misappropriate the data).

As such, the one or more organization systems 10 may be utilized to control access to the zoned data systems 30, and allow, prevent, and/or monitor usage of the zoned data systems 30 through communication with the one or more user computer systems 20, the one or more zoned data systems 30, the one or more third-party systems 40, and/or the one or more other systems, as will be discussed in further detail herein. As will be described in further detail herein, embodiments of the present invention allow for improved security and reduced storage requirements through the improved data storage techniques described herein.

The network 2 illustrated in FIG. 1, through which the systems communicate, may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more zoned data systems 30, the one or more third-party systems, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to monitor, communicate with, and/or take actions with respect to the authorized users and systems and/or unauthorized users and systems). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically for monitoring, communicating with, and/or capturing information from authorized and/or unauthorized users and/or system, and/or storing and accessing data within zoned databases (e.g., by interacting with the user computer systems 20 and user applications 27, communicating with the zoned data systems 30 and zoned data applications 37, third-party systems, and/or other systems).

As illustrated in FIG. 1, users 4 may try to access the organization systems 10 in order to store and/or access data from the one or more organization systems 10 and/or one or more zoned data systems 30 (e.g., any type of unsecured or secured data for which the user would like to store or access, or the like). In some cases the users 4 may be authorized users, such as users that have access to the one or more organization systems 10 and/or the one or more zoned data systems 30. Alternatively, the users 4 may be unauthorized users, such as users that are trying to misappropriate data from the one or more zoned data systems 30. The users 4 may utilize the one or more user computer systems 20 (e.g., authorized user computer systems or unauthorized user computer systems) to communicate with and/or access data from the one or more organization systems 10 and/or the one or more zoned data systems 30. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or one or more user applications 27 used by any of the foregoing, such as web browsers applications, dedicated applications, specialized applications, or portions thereof. It should be understood that the one or more computer systems 20 may be systems that are internal to the organization (e.g., users are employees, or the like) or may be systems that are external to the organization (e.g., users are located outside of the organization).

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more zoned data systems 30, the one or more third-party systems 40, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, a web browser or other applications that allow operation of the one or more user computer systems 20, and that allow users 4 to access and/or take various actions with respect to the one or more organizations systems 10 and/or the one or more zoned data systems 30, through the use of the one or more user computer systems 20, or the like.

As illustrated in FIG. 1, the one or more zoned data systems 30 may communicate with the one or more organization systems 10 and/or the one or more user computer systems 20 directly or indirectly (e.g., through the one or more organization systems 10). The one or more zoned data systems 30, and/or the one or more zoned data applications 37 thereof, may provide the one or more zoned databases and/or the control of the one or more zoned databases. It should be understood that the one or more zoned data systems 30 may be third-party systems 40 and/or may be part of the organization systems 10. As such, the one or more zoned data systems 30 are operatively coupled, via a network 2, to the one or more organization systems 10, the one or more user computer systems 20, the one or more third-party systems 40, and/or the one or more other systems. The one or more zoned data systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other systems or components on the network 2, such as, but not limited to, the one or more organization systems 10, the one or more user computer systems 20, the one or more third party systems 40, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more zoned data systems 30 may have computer-readable instructions 38 stored in the one or more memory components 36, which in some embodiments includes the computer-readable instructions 38 of one or more zoned data applications 37 that store portions of data in different zones (e.g., a first portion of data in a first zoned database, a second portion of data in a second zoned database, an $n^{th}$ portion of data in an $n^{th}$ zoned database, or the like) and/or mixes discrete data together to mask data, both of which, alone or in combination, improve data security and/or data storage capacity. For example, the zoned database storage of divided data that is part of a larger combination of data makes it difficult for unauthorized users to access the separate zoned databases that have separate access rights (e.g., different database administrators manage the different zoned databases, or the like). In other examples, discrete data (e.g., real data used by different users for different purposes) may be integrated and stored, which makes it difficult for unauthorized users to identify the discrete data in which they are interested, and also reduces data storage requirements because specific data (e.g., "fake" data) does not have to be created and stored to use as masking. It should be understood that the access to the one or more zoned data systems 30, or applications thereof, may be controlled by the one or more organization systems 10 and/or one or more user computer systems 20, as is described herein.

Moreover, as illustrated in FIG. 1, the one or more third-party systems 40 and/or one or more other systems (not illustrated) may be operatively coupled to the one or more organization systems 10, the one or more user computer systems 20, and/or the one or more zoned data systems 30, through the network 2. The one or more third-party systems 40 and/or the other systems have features that are the same as or similar to the features described with respect to the one or more organization systems 10, the one or more user computer systems 20, and/or the one or more zoned data systems 30 (e.g., one or more communication components, one or more processor components, and one or more memory components with computer-readable instructions of one or more applications, one or more datastores, or the like). Thus, the one or more third party systems 40 and/or the other systems communicate with the one or more organization systems 10, the one or more user computer systems 20, the one or more zoned data systems 30, and/or each other in same or similar way as previously described with respect to the one or more organization systems 10, the one or more user computer systems 20, and/or the one or more zoned data systems 30. It should be understood that the one or more third-party systems 40 may store data, act as an intermediary, and/or interact with the various systems that may be needed for operation of the zoned database system environment 1 described herein.

It should be understood that when used herein, the term requestor may include any users (e.g., authorized and/or unauthorized) and/or systems (e.g., authorized or unauthorized), such as user computer systems, organization systems, third-party systems, and/or the other systems. Moreover, it should be understood that the requestor may be the user or system that is making the initial request, or the requestor may be an intermediary that receives the initial request and in turn is responsible for accessing the data from the one or more zoned database systems.

FIG. 2 illustrates a process flow for utilizing and controlling zoned database storage in order to improve security of the stored data. Block 110 of FIG. 2 illustrates that a request is received from a requestor to divide data for storage in two or more zoned databases, and such request is authenticated. As such, the one or more organization systems 10 and/or one or more zoned data systems 30 receive one or more authentication credentials from a requestor (e.g., user and/or system) to access data within the one or more zoned data systems 30 directly and/or through the one or more organization systems 10. It should be understood that the one or more authentication credentials may be any type of authentication credential and/or combination of authentication credentials. For example, in some embodiments the one or more authentication credentials may include a user identification (e.g., user name, string of characters—numbers, alphabetic and/or symbols, e-mail address, phone number, or the like) and/or a password, security questions, one-time password, biometric identification (e.g., fingerprint, eye scan, facial recognition, or the like), computer system identification (e.g., mobile device identifier, laptop device identifier, or the like), network connectivity identification (e.g., Wifi, IP address, or the like), geolocation, wearable device, secondary device authentication, or the like.

It should be further understood that the data that the requestor (e.g., user 4 and/or system) is requesting to divide (or requesting to access as will be discussed later) may relate to any type of secure data, such as but not limited to technological data, client data, customer data, personal data, or the like. In some embodiments the data my include resource pool data of the user (e.g., financial account data of the user). Moreover, in some embodiments the secure data may include a user name (e.g., customer name), address, telephone number, registered device identifiers (e.g., user computer systems identification), social security number, resource pool balances, or other like customer information. As such, the requestor, which may be an employee of the organization, and/or a system within the organization, may be accessing and/or storing the data, such as customer data, within the one or more zoned data systems 30 (e.g., one or more zoned databases), which will be described in further detail herein. In one example, the data may be user data that includes a user name, user identifier (e.g., SSN), and/or user resource data. In this way the user data may be divided into a user name portion, a user identifier portion (e.g., SSN portion), and a user resource portion (e.g., resource pool balance, number, or the like). The user data may be divided into these different portions for storage in separate zoned databases that have different access rights. Moreover, the portions of the divided data may be further divided, for example, the user identifier may be divided into different portions (e.g., the first five digits of a SSN and the last four digits of the SSN, or the like).

Block 120 of FIG. 2 illustrates that the data is divided into two or more portions of data (e.g., the data is divided into a first portion, a second portion, and/or an $n^{th}$ portion). The division of the data may be decided by the user (e.g., as the user would like to divide the data), the systems (e.g., automatically based on pre-defined divisions of data), and/or the organization (e.g., the request may be made for a specific division which may or may not be how the data is actually divided as decided by the organization, or employee thereof). For example, a user 4 may request a specific division of the data based on how the data will be used, such as a data portion that will be routinely accessed and a data portion that is to be kept secret. In other examples, pre-defined divisions of data may be made for uniform storage of data, such as resource pool identifiers and/or SSNs may be divided the same way for consistency throughout the organization or sub-unit thereof. In some examples, employees of the organization may look at the requested storage of data and determine based on the future use of the data (or portions thereof), standard practices, and the specific request from the requestor, how to divide the data.

It should be understood that the data may be divided based on secure data and unsecure data within the data, based on splitting up different individual elements of the data (e.g., separating names, SSN, account numbers, or the like from each other), based splitting parts of individual elements (e.g., portions of SSN—last four characters from the first five characters, portions of resource pool identifiers—last four characters of the identifier, or the like), or other like divisions. The data may be divided through the use of a disassembler (otherwise described as a disassembly engine) that includes protocols, algorithms, processes, technology, or the like that is responsible for dividing the data into the desired portions. It should be understood that the disassembler will divide the data in a way that allows the data to be reassembled in the future through the use of an assembler, which will be described in further detail later. Returning to the example above, the user name portion, user identifier portion (or subset thereof), and/or resource pool portion may be disassembled in a way that allows the correct user names, user identifiers, and/or resource pool amounts to be reassembled, such as through the use of patterns, pointers, or the like that divides data in a way that related data can be reassembled. The disassembler and/or assembler may be stored and/or operated by one or more of the organization systems, user computer systems, zoned database systems, third-party systems, and/or other systems.

FIG. 2 further illustrates in block 130 that after dividing the data, the two or more portions of data are stored within different zoned databases. It should be understood that zoned databases may be separate databases that may have separate constraints regarding the actions requestors (e.g., users and/or systems) may take with respect to the individual zoned databases and/or the data stored therein. The two or more zoned databases may be located within one or more database arrays. Moreover, the zoned databases may be connected to each other in parallel (e.g., horizontally), in series (e.g., vertically), within each other (e.g., one database within another database), and/or in combinations of these (e.g., diagonal that includes both horizontal and vertical, and/or other like configurations) within the one or more database arrays. As such, the one or more zoned databases may be operatively coupled to each other when the data portions within the zoned databases are related to the same data (e.g., can be combined to form the original data). In should be understood that there may be any number of zoned databases connected (e.g., databases 1-5 horizontally, and databases 6-10 vertically).

It should be further understood that the two or more zoned databases (e.g., vertical, horizontal, or other like combinations thereof) may be operatively coupled together in such a way that allows the two or more zoned databases to be removed, reassigned, and/or transferred in response to reorganization of the data stored, if portions of the organization (and thus any related data) is being transferred to another entity, for specific research into the two or more zoned databases, or the like. Moreover, should the two or more zoned databases be removed (e.g., for transfer to a different portion of the organization, and/or different organization), the remnants of the data in the two or more zoned databases may be removed, and the data lineage may be stored for reporting purposes, and/or the data may be refilled with data filler. It should be understood that these one or more "vacant" zoned data bases may be filled by other related data, included masked data, as will be discussed in further detail herein.

Block 140 of FIG. 2 illustrates that data access rights may be assigned to the two or more zoned databases (e.g., the databases that store the divided data, the connections between the data, or the like). For example, a first user or group of users, and/or first user computer systems associated with the first user(s), may be able to access all of the data within a first zoned database, while a second user or group of users, and/or second user computer systems associated with the user(s), may be able to access all of the data within a second zoned database. It should be understood that the first group of users and/or first user computer systems may not be able to access the data within the second zoned database, and vice versa. Alternatively, or additionally, various users may have different access for the various databases (e.g., first user(s) can access first data in the first zoned database but are only able to view parts of the data in the second zoned database). It should also be understood that a database array administrator may have access to one or more database arrays in which the two or more zoned databases are located; however, the database array administrator may not have access to the data within the two or more zoned databases (e.g., may not know what the data is, may know what the data is but not have access to it, or the like). In this way, no one user or system has access to all of the zoned databases. As such, as will be described in further detail later, an unauthorized requestor that has misappropriated authentication credentials (e.g., passwords, or the like) to access a zoned database, or an authorized requestor that is planning to misappropriate data from a zoned database, is not able to access all of the data (e.g., data from multiple zoned databases), and instead is only able to access the data portion that was stored within the zoned database for which the user has access (e.g., authorized or unauthorized access to such data). Moreover, the users and/or systems that are responsible for assigning access to the one or more zoned databases may not be able to designate themselves as having access to the one or more zoned databases (e.g., they can only designate others).

The various zoned databases may have different levels of security in that different zoned databases may require different authentication means (e.g., different types or number of authentication credentials, or the like). It should be further understood that the database access rights may also include how the data is displayed to, and/or accessed by, various requestors (e.g., users and/or systems). For example, some databases may be hidden, selectively hidden, partially hidden, and/or available to all users. That is, some databases may include secure data that the organization will not expose except to specific users and/or systems. For example, some databases may be set up to require one or more forms of authentication credentials in order to access the data. More secure zoned databases may require more forms of authentication. Other zoned databases, such as selectively hidden databases may hide data most of the time and require one or more forms of authentication credentials in order to access the data; however, the data, or portion thereof, may be revealed to one or more users and/or systems in response to a specific event. The event may be specific instances within the organization that may require more systems and/or users to access the data at certain times (e.g., for audit purposes, or the like). As such, the selectively hidden zoned databases may provide at least some access during specific times to specific users and/or systems as determined based on the occurrence of specific events. Partially hidden zoned databases may allow for the display of some data to all users, but hide other data within the zoned database. For example, customer names and resource pool numbers may be stored in a first zoned database, while customer SSNs may be stored in a second zoned database. The partially hidden zoned databases may allow all users to view the user names in the first zoned database, but the same zoned database hides the resource pool numbers, and/or may allow all users to view the last four digits of the SSNs, but hide the first five numbers of the SSNs. In some embodiments, the zoned database may allow all users and/or systems to view and/or access the data within a zoned database when the data is not confidential (e.g., when the data being stored is for example, public information such as directory information, like names and telephone numbers).

FIG. 2 further illustrates in block 150 that after data has been assigned to two or more zoned databases and access rights are established for such zoned databases, a request may be received to access data from the organization and/or zoned databases. It should be understood that the request may be made from the same requestor as described with respect to block 110 (e.g., the requestor that made the request to divide the data) and/or from a different requestor (e.g., a requestor that does not know that data was divided into two or more portions, or the like). For example, the request may be made by an employee and/or system within the organization and the request may be to access customer identifiers (e.g., user name, user identification, password, or the like) and a portion of a customer SSN. The request may be in response to confirming customer information by displaying such information in a customer interface for a customer to approve, and/or in order to confirm authentication of the customer (e.g., confirm the stored user name, password, and portion of the SSN matches the portion received from the customer, or the like).

Regardless of the reason for the request, in response to receiving the request, as illustrated in block 160, the requestor may be identified in order to authenticate and/or determine the access that the requestor may have with respect to the data that is being requested from the one or more zoned databases. The requestor may be authenticated in the same or similar ways as described above with respect to block 110 of FIG. 2. When the requestor is authenticated, the process may move to block 170 of FIG. 2; however, alternatively, as illustrated by block 165, when the requestor is not authenticated the process may move to block 310 of FIG. 4, as will be described in further detail later.

Block 170 of FIG. 2 illustrates that when the requestor is authenticated the one or more zoned databases are accessed in order to capture the requested data from the one or more zoned databases. Returning to the example discussed with respect to block 150, since the requestor may only need the last four digits of a customer's SSN, then the system will access the zoned database with just the last four digits of the customer's SSNs, as well as the database with the customer's identification. In this way, the requestor only has access to what the requestor needs to perform the task for which the requestor is authorized. In traditional data storage the requestor would have access to the customer's identification (e.g., name, ID, password, or the like) and the customer's entire SSN.

Additionally, in some embodiments of the invention when the one or more zoned databases are accessed, the requestor (e.g., user computer system or other requesting system) reaches out to each zoned database (e.g., the systems and/or applications associated with each zoned database), and each zoned database accesses the requested information. For example, the requestor (e.g., requestor system) reaches out to the zoned database that stores the customer identification, the separate zoned database that stores the last four digits of the user SSN, and potentially the zoned database that store the association between the zoned databases and/or how the data was divided and/or can be assembled (e.g., disassembler and/or assembler). As such, the requestor only has access to the final data assembled, not to all of the other customer data in each zoned database. Again, returning to the example, the requestor only receives the customer identification and the last for digits of the customer's SSN from the zoned databases, and does not have access to all of the other customer data from all of the zoned databases.

FIG. 2 further illustrates in block 175 that the two or more portions of data from the two or more zoned databases are reassembled through the use of an assembler. The assembler (e.g., the reverse of the disassembler) provides the instructions, protocols, algorithms, or the like for assembling the data portions from the zoned database together into the original data (e.g., pre-divided data). As previously described above, the assembler may be stored in an assembler zoned database, such that only specific requestors (e.g., users and/or systems) have access to the assembler. As such, it should be understood that separate requestors (e.g., users and/or systems) have access to the first zoned database, the seconded zoned database, and in some cases additional zoned databases. For example, the zoned database(s) are not accessed by a single requestor, and as such, an unauthorized requestor trying to access the two or more portions of data would need to misappropriate the security measures (e.g., login credentials, access rights, or the like) for each of the zoned databases. For example, the assembler may include algorithms or other means that indicate how the data portions from a first zoned database correspond to other data portions from other zoned databases (e.g., how the seemingly unrelated random data can be reassembled into useful data). Returning to the previous example, a third zoned database may store how the portions of data from the zoned databases should be reassembled. For example, the assembler indicates how the customer identification (e.g., customer name, customer identification, or the like) from the first zoned database corresponds to the last four digits of the SSN of the customer in the second zoned database.

Block 180 of FIG. 2 illustrates that the one or more portions of data are provided to the requestor in accordance with the authentication of the requestor. For example, the data (e.g., single portion of data from a single zoned database and/or the assembled data from the two or more zoned databases) is provided (e.g., electronically sent, displayed, or the like) to the requestor based on the rights such requestor has with respect to the data (e.g., single portion of data and/or the assembled data).

FIG. 3 illustrates a process flow for masking and/or encoding data to improve security, in accordance with embodiments of the invention. It should be understood that the process in FIG. 3 may be separate from, or be included within, the process described with respect to FIG. 2. With respect to FIG. 3 it should be understood that while data may be secured within a database using one or more security means (e.g., user name and password, security questions, key fob, or the like), it may be beneficial to provide additional security measures, such as masking and/or encoding the data within the database in addition to controlling access to such database. With respect to masking data within a database, masking may include creating "fake" data that is intermixed with the real data. In this way, should the data within the database be compromised (e.g., an unauthorized user gets access to the data or authorized user misappropriates the data) the requestor is unable to identify what is real data and what is fake data (e.g., because the requestor does not know how the data is masked and/or cannot marry the data with other relevant data because of the inclusion of the fake data). For example, it would be difficult to match SSNs, user name, and/or account numbers included different zoned databases if the SSNs numbers and/or account numbers included fake SSNs and/or account numbers (e.g., because there would be more SSNs and/or account numbers than user names and/or the unauthorized requestor does not know what is real data and what is fake). However, in order to mask data within a database (e.g., zoned database, or database with the full data) the "fake" data has to be created and stored in order provide the benefits of masking. The creation and storage of this excess "fake" data increases the storage space needed to created and/or store such "fake" data.

As will be discussed in further detail with respect to FIG. 3, instead of using "fake" data, in some embodiments, the systems utilizes real discrete data for masking. For example, real first discrete data may be combined with real second discrete data, to mask each other. The real first discrete data and real second discrete data are unrelated, and as such, even if the real first discrete data and real second discrete data are separated (e.g., unmasked), both data portions are unrelated and have no meaning with respect to each other. The real first discrete data is useful to a first user and the real second discrete data is useful to a second user for different purposes. With respect to encoding the data, it should be further understood that the data within the database may be encoded, such as encrypted either before and/or after the two or more discrete data is assembled into masked data. This may add another level of security to the data within the database. The masking and/or encoding process is described in further detail with respect to FIG. 3.

Block 210 of FIG. 3 illustrates that a request is received from a requestor to store data with masking and/or encoding. As described above, it should be understood that the requestor may be the user or system making the initial request to mask the data, or the requestor may be the user or system that received the original request and is responsible for identifying the two or more discrete data (e.g., based on data type, relationship of the data to other data, or the like) to combine to create the masked data, and to store such data. As such, the requestor may be the user and/or system that is responsible for determining the two or more discrete data that should be combined based on data type (e.g., characters used—such as numbers, alphabetic, special characters, or the like, length of data, format of data—such as use of commas and decimal places, or the like). Alternatively, the two or more discrete data is pre-identified such that when a request is received for masking first discrete data, the type of first discrete data may be determined and the second discrete data may be automatically determined for masking both the first and second discrete data.

As illustrated by block 220, the data that the requestor wants to store may be assembled with other discrete data. For example, first data that the requestor may want to mask may be assembled with second discrete data (e.g., unrelated data sets, or the like). As a specific example, the requestor may want to mask SSNs, and as such, the SSNs may be masked by combining the SSNs with second data that has the same number of characters (e.g., account numbers also having nine digits, or the like). As such, the system may identify two discrete sets of data that may be combined in order to mask the first data (e.g, SSNs) and the second data (e.g., account numbers unrelated to the SSNs). It should be understood that the two or more discrete data sets or portions of a data set may come from within the same organization, line of business, or the like; however, it should be understood that in some embodiments the discrete data may come from two different organizations, lines of businesses, or the like. Regardless of where the discrete data comes from, by masking data using two sets of unrelated data there is no need to create and/or store fake data that is used to mask the real data. As such, should there be a large number of databases, each including "fake" data to create masked data, an organization may be able to save the computing power and storage space required to create and/or store the "fake" data needed to mask the real data. It should be understood that any number of discrete data sets may be used to mask data (e.g., 2, 3, 4, 5, or the like number of data sets). It should be further understood that in some embodiments instead of using discrete data sets of useable data, the individual datasets themselves may be masked (e.g., masked data—two or more discrete data sets, that are then masked with one or more discrete data sets or other masked data).

In some embodiments, in order to mix the two or more discrete data into masked data, an integrator may be utilized that determines how the first data may be mixed with the second data. In some embodiments the integrator may mix the first data with the second data randomly, based on an algorithm, and/or through some other means. It should be further understood that in some embodiments, the first data and/or the second data may have to be converted in order to be combined, which may or may not be accomplished through the use of the integrator. For example, with respect to SSNs, which are nine digits long and account numbers, which may be of any type of length, the SSNs and/or the account number length may be altered through the use of the integrator and/or other means such that the SSNs and the account numbers look like the same data type before or after they are integrated. This conversion may be part of the integrator process or the encoder process described in further detail below.

As illustrated by block 225, it should be understood that after the two or more discrete data are integrated into masked data, the masked data is stored along with the integrator and/or separator that is used to integrate the two or more discrete data and/or separate the masked data into the two or more discrete data. It should be understood that in some embodiments of the invention the integrator and/or separator may be stored in one or more databases (e.g., zoned databases as previously described herein) in order to provide additional security by keeping the integration and/or separation means under separate access rights from the masked data (e.g., an unauthorized requestor would have to misappropriate the authentication for access to both the masked database and the integrator and/or separator database).

Alternatively, or in addition to the masking, as illustrated by block 230, the two or more discrete data may be encoded before and/or after the data is masked (e.g., integrated, or the like). In this way, additional levels of security may be provided by either encoding the two or more discrete data before or after being integrated. Returning to the example, the SSNs and/or account numbers may be encoded, and/or the combined SSNs and account numbers may be encoded (e.g., encoded before masking or after masking). Encoding the data before integrating to form the masked data may prevent an authorized first user and/or system that is interested in the first data from being able to view the second data because the first user and/or system only has access to decode the first data (e.g., the first user may see the second data, but such second data is encoded).

As illustrated by block 235, the encoder and/or decoder are stored for future access. As was the case with the integrator and/or separator, the encoder and/or decoder may be stored within a single database with other encoders and/or decoders for other data, or within individual databases (e.g., specifically for each encoder and/or decoder). The databases may be one or more zoned databases in order to keep such means for encoding and/or decoding separate from the data and/or each other in order to increase the security of the data.

As further illustrated in FIG. 3, block 240 illustrates that a request is received from a requestor to access at least a portion of the masked data. The request made by the requestor is for one of the two or more discrete data that is masked within the masked database. Returning to the example, the request may be to access a stored SSN. As discussed with respect to block 210 the requestor may be the initial requestor, an intermediary responsible for in charge of routing the request, and/or the system responsible for in charge of the database that stores the requested data.

The request may include authentication credentials for the requestor. The requestor may be authenticated in the same or similar way as previously described herein. As illustrated by block 250 in FIG. 3, the requestor may be authenticated, and thus, able to receive and/or access the requested data. Alternatively, as illustrated by block 255, the requestor may not be authenticated (e.g., found to be unauthorized), and as such the process may move to FIG. 4, which will be described in further detail later.

As illustrated in block 260, when the requestor is authenticated the masked data may be accessed, along with a separator and/or decoder (e.g., stored in one or more zoned databases) for the masked data. It should be understood that the requestor may not have access to the database(s) containing the separator and/or decoder, and instead the separator and/or decoder may be accessed by other requestors (e.g., other users and/or systems) that are different than the systems that access the masked data. Returning to the example, the requestor accesses the masked database and identifies the requested data.

As illustrated by block 270 the separator separates the masked data into the two or more discrete data. The separation may occur within the masked database, and/or after the masked data is removed the masked database. Moreover, additionally or alternatively, as illustrated by block 275, a decoder may decode the masked data and/or the two or more discrete data. It should be understood that in some embodiments the separator and/or decoder perform the opposite process used by the integrator and/or encoder in order to capture the requested data. Returning to the example, the separator separates the masked SSN(s) from the masked account number(s) and/or the decoder decodes the SSN(s) in order to retrieve the desired SSN(s) requested.

As illustrated by block 280 the requested data is provided to the requestor. It should be understood that in some embodiments the data (e.g., stored and accessed) may only be a data portion that is stored in a zoned database, and thus, needs to be assembled with one or more other data portions in order to receive the requested data, as described with respect to FIG. 2. For example, the SSN(s) may be separated from the account numbers, and thereafter decoded; however, the SSN(s) may also be assembled with user names and/or other account numbers that were stored in other zoned databases through the use of an assembler, as was previously described with respect to FIG. 2. It should be understood that the account numbers used to mask the SSN(s) are not presented to the requestor or are not visible to the requestor because they are still encoded and/or the requestor does not have access to the encoded account numbers.

Once the data is with the requestor it may be difficult to maintain any control over the data and/or know when the requested data is not being used as intended. As illustrated in block 290 of FIG. 3, in some embodiments a marker may be coupled to the data. The marker may be any type of marker such as an applet, metadata, or other information that is operatively coupled to the data and that can be monitored to determine how the data is used (e.g., by employees within the organization, or the like).

FIG. 4 illustrates a process flow for deterring potential misappropriation of data by requestors (e.g., unauthorized users or systems and/or authorized users that may be misappropriating data), in accordance with one or more embodiments of the invention. As illustrated by block 310 in FIG. 4, a requestor may be identified as unauthorized in a number of different ways. It should be understood that a request and/or requestor is unauthorized when the requestor's authentication credentials do not meet stored authentication credentials for access to a database (e.g., zoned database, or the like) associated with the request. As an example, the requestor's user name, password, security questions, requestor computer system, or the like does not match the stored authentication credentials for the requestors that have access to the one or more databases that are associated with the request. In other embodiments of the invention, a requestor's authentication credentials may initially authenticate the requestor as having access to the data requested; however, based on the type of data accessed and/or the volume of data accessed the system may identify a request and/or requestor as unauthorized. For example, the requestor may have access to data within a database (e.g., zoned database or otherwise), and may access such information once a week and/or for a small number of customers (e.g., 10, or the like). Alternatively, if the requestor starts to access data more frequently (e.g., multiple times a day) for a large number of customers (e.g., hundreds, or the like), then the requestor that is typically identified as authorized may be flagged as unauthorized.

As illustrated by block 320 of FIG. 4, regardless of how the requestor or request is identified as being unauthorized, the system identifies the one or more databases and/or data within the databases to which the unauthorized requestor gained access and/or tried to access. Moreover, the system identifies that the one or more other databases (e.g., related zoned databases) that are related to the one or more databases and/or data within the databases which the unauthorized user tried to access. It should be understood that the organization may be able to determine what data was actually viewed and/or downloaded out of the one or more databases (e.g., zoned databases) accessed by the requestor. Alternatively, or additionally, the organization may identify the one or more databases and/or data therein that the requestor tried to access. Thereafter, the system may access one or more zoned databases in order to identify how data within a particular database is assembled with other data from other zoned databases. As an example, the unauthorized requestor may have accessed or tried to access the SSNs (or portions thereof, such as the last four digits of the SSN) stored by the organization. Moreover, the system may determine the other zoned databases that store data related to the SSNs accessed or tried to access by the requestor (e.g., the zoned databases that would allow the SSNs to be reassembled with user identifiers, resource pool numbers, or other like data).

FIG. 4 further illustrates in block 330, that once the unauthorized requestor is identified and the database and/or the data within the database that the unauthorized requestor accessed and/or tried to access is identified, the organization may repeal any correlation between the database and any related databases (e.g., remove operative coupling between the zoned databases and other zoned databases). For example, should the database accessed by the unauthorized requestor have a data portion that is a part of a larger data set, any correlation between databases (e.g., between zoned databases) may be edited, removed, and/or blocked. As such, specific assemblers or other means for coupling zoned databases (e.g., pointers, or the like) within a zoned database, or located in separate zoned databases, which store the correlation between databases may be edited, removed, and/or blocked such that requestors (or just unauthorized requestors) are not able to access the other related data portions in other databases. In this way, even if an unauthorized requestor gained access to a portion of data within a zoned database, the unauthorized requestor may not be able to identify the locations of the other portions of data that are associated with the original misappropriated data, and which are needed to make the original data meaningful. For example, even if the unauthorized requestor was able to access a zoned database with the last four digits of SSNs, the data is meaningless without being able to access the other zoned databases that store the first five digits of the SSNs and/or the user names, user identifiers, or the like. Moreover, with respect to masked data, such as masked SSNs, the masked data is meaningless without being able to identify the separator (e.g., which may be stored in another zoned database) that is used to separate the two or more discrete data from the masked data in the masked database in order to identify the data in which the user may be interested (e.g., the SSNs).

Block 340 of FIG. 4 further illustrates that in some embodiments of the invention, when the requestor is identified as unauthorized the organization may direct the unauthorized requestor to unintended locations, such as unrelated databases (e.g., having unrelated non-proprietary data) and/or endless loops that are not directed to any particular location. For example, the unrelated databases may contain data that the requestor may not be interested in and is not confidential, but may be presented to the requestor such that the requestor is not aware that the organization has identified the requestor as unauthorized. Alternatively, the organization may direct the unauthorized requestor on paths to access the database in which the unauthorized requestor may be interested (e.g., zoned databases that have the associated data for the data the unauthorized user has already misappropriated); however, instead of the unauthorized user being able to reach the zoned database, the organization may provide an loop that directs the unauthorized user towards such databases, but that prevents the unauthorized requestor from ever reaching the desired database. Returning to the previous example, the unauthorized requestor may have misappropriated SSNs (or portion thereof) and may now be trying to access related user names, user identifiers, and/or resource pool numbers and/or balances from zoned databases; however, in response the systems may direct the requestor to unrelated user names, user identifiers, and/or resource pool numbers such that the unauthorized requestor may believe that the relevant data has been accessed, but in reality the data is unrelated to the misappropriated SSNs. Alternatively, in response the systems may direct to the requestor towards an endless loop in which the requestor never actually reaches the next database.

In other embodiments of the invention, as illustrated by block 350, in some embodiments the organization may create imitation data to present to the unauthorized requestor. The imitation data may be provided in imitation databases (e.g., data interfaces, data structure, or the like) that may mimic the database in which the unauthorized requestor is interested. However, the imitation data and/or the imitation databases act as fake data, and as such, the unauthorized requestor may not realize that the data accessed is meaningless. Returning to the previous example, it should be understood that the SSNs, the related data (e.g., user names, user identifiers, resource pool numbers and/or balances, or the like), and/or the means for assembling, separating, and/or encoding such data may be imitation data, such that even if the unauthorized requestor access a portion of real data and/or the assembler, separator, and/or decoder, the system may generate imitation data such that the unauthorized user is not able to identify the complete set of original data and/or the assembly, separation, and/or decoding of such data is not correct. That is, at least a portion of the data is imitation and/or reassembly of the real data is incorrect.

With respect to block 330 the unauthorized requestor may suspect that the organization knows that the unauthorized requestor is trying to access the related databases. However, with respect to blocks 340 and 350 it may be unlikely that the unauthorized requestor suspects that the organization knows that the unauthorized requestor is trying to access various data because the unauthorized requestor is being directed to other zoned databases and/or is being provided imitation data instead of the data in which the requestor is actually interested.

Block 360 of FIG. 4 further illustrates, that regardless of what deterrence method is implemented (e.g., severing the relationship between zoned databases, directing the unauthorized requestor to unrelated databases or infinite loops, presenting imitation data to the unauthorized users, or the like), the system may capture information regarding the unauthorized user based on the data deterrence process. The information captured may be based on the unauthorized requestor's access and use of real data, based on the unauthorized requestor's attempt to identify related databases (e.g., data in zoned databases that relate to a successful and/or attempted misappropriation of data, or the like), and/or through the use of markers associated with the real data and/or imitation data, which are used to monitor how the unauthorized requestor uses the real data and/or imitation data.

It should be understood that the systems and processes described herein relate to the use of zoned databases, the use of masking, and/or the deterrence of unauthorized requestors and/or requests, which alone or in combination improve the security of the data storage because it provides systems and processes that make it more difficult for an unauthorized requestor (e.g., unauthorized user or system, and/or authorized user or system that is misappropriating data, or the like) to identify and/or access combinations of data that are useful for an unauthorized user. Moreover, the systems and processes described herein may also improve data storage capacities because instead of utilizing "fake" data to mask real data within a database, discrete sets of the real data are combined in order to creating the masked data, thus eliminating the need for the creation and storage of "fake" data.

The systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A security system for masking data through integration of discrete data, the system comprising:
   one or more memory components having computer readable code stored thereon; and
   one or more processor components operatively coupled to the one or more memory components, wherein the one or more processor components are configured to execute the computer readable code to:
      identify two or more discrete data sets, wherein the two or more discrete data sets comprise at least first data and second data, wherein the first data is unrelated to the second data, and wherein the first data and the second data are real data;
      apply an integrator to combine the two or more discrete data sets into masked data, wherein the two or more discrete data sets within the masked data have a data type that is the same; and
      store the masked data in a masked database.

2. The system of claim 1, wherein the one or more processor components are configured to execute the computer readable code to:
   store the integrator in an integrator database; and
   wherein the masked database and the integrator database are zoned databases with independent access rights.

3. The system of claim 2, wherein the one or more processor components are configured to execute the computer readable code to:
   store a separator in a separator database; and
   wherein the separator database is included in the zoned databases.

4. The system of claim 3, wherein the one or more processor components are configured to execute the computer readable code to:
   receive a request from a requestor to access the first data or the second data from the masked data in the masked database;
   determine authentication for the requestor to access the first data or the second data; and
   determine the requestor is an unauthorized requestor.

5. The system of claim 4, wherein the zoned databases are operatively coupled to each other, and wherein the one or more processor components are configured to execute the computer readable code to:
   repeal access to one or more zoned databases from the zoned databases that are operatively coupled to the masked database when the requestor is determined to be the unauthorized requestor.

6. The system of claim 4, wherein the zoned databases are operatively coupled to each other, and wherein the one or more processor components are configured to execute the computer readable code to:
   direct the requestor to a continuous loop to prevent the requestor from accessing other zoned databases within the zoned databases when the requestor is determined to be the unauthorized requestor.

7. The system of claim 4, wherein the zoned databases are operatively coupled to each other, and wherein the one or more processor components are configured to execute the computer readable code to:
   identify imitation data and present the imitation data to the unauthorized requestor instead of the first data, the second data, or the masked data when the requestor is determined to be the unauthorized requestor.

8. The system of claim 7, wherein the imitation data is presented within one or more imitation databases.

9. The system of claim 3, wherein the one or more processor components are configured to execute the computer readable code to:
   receive a request from a requestor to access the first data or the second data from the masked data in the masked database;
   determine authentication for the requestor to access the first data or the second data;
   determine the requestor is an authorized requestor;
   access the masked data from the masked database;
   access the separator from the separator database;
   apply the separator to the masked data to identify the two or more discrete data sets;
   determine the first data or the second data from the two or more discrete data sets; and
   provide the first data or the second data to the requestor.

10. The system of claim 1, wherein the one or more processor components are configured to execute the computer readable code to:
    encode the two or more discrete data sets before applying the integrator to the masked data or after applying the integrator to the masked data in order to encode the masked data.

11. The system of claim 1, wherein the first data is a first data type and the second data is a second data type, and wherein the one or more processor components are configured to execute the computer readable code to:
    convert the second data from the second data type to the first data type before applying the integrator to the two or more discrete data sets.

12. The system of claim 11, wherein the first data type is a first character string of a first length, wherein the second data type is a second character string of a second length, wherein the second length of the second character string is converted to the first length.

13. The system of claim 3, wherein the masked data is unusable without the separator for separating the masked data into the two or more discrete data sets, which requires an unauthorized user to gain separate access to the zoned databases.

14. A computer implemented method for a security system for masking data through integration of discrete data, the method comprising:
    identifying, by one or more processor components, two or more discrete data sets, wherein the two or more discrete data sets comprise at least first data and second data, wherein the first data is unrelated to the second data, and wherein the first data and the second data are real data;
    applying, by the one or more processor components, an integrator to combine the two or more discrete data sets into masked data, wherein the two or more discrete data sets within the masked data have a data type that is the same; and storing, by the one or more processor components, the masked data in a masked database.

15. The method of claim 14, further comprising:
storing, by the one or more processor components, the integrator in an integrator database; and
wherein the masked database and the integrator database are zoned databases with independent access rights.

16. The method of claim 15, further comprising:
storing, by the one or more processor components, a separator in a separator database, wherein the separator database is included in the zoned databases.

17. The method of claim 16, further comprising:
receiving, by the one or more processor components, a request from a requestor to access the first data or the second data from the masked data in the masked database;
determining, by the one or more processor components, authentication for the requestor to access the first data or the second data; and
determining, by the one or more processor components, the requestor is an unauthorized requestor.

18. The method of claim 16, further comprising:
receiving, by the one or more processor components, a request from a requestor to access the first data or the second data from the masked data in the masked database;
determining, by the one or more processor components, authentication for the requestor to access the first data or the second data;
determining, by the one or more processor components, the requestor is an authorized requestor;
accessing, by the one or more processor components, the masked data from the masked database;
accessing, by the one or more processor components, the separator from the separator database;
applying, by the one or more processor components, the separator to the masked data to identify the two or more discrete data sets;
determining, by the one or more processor components, the first data or the second data from the two or more discrete data sets; and
providing, by the one or more processor components, the first data or the second data to the requestor.

19. The method of claim 14, wherein the first data is a first data type and the second data is a second data type, and wherein the method further comprises:
converting, by the one or more processor components, the second data from the second data type to the first data type before applying the integrator to the two or more discrete data sets.

20. A computer program product for a security system for masking data through integration of discrete data, the computer program product comprising at least one non-transitory computer-readable medium having computer-readable program code portions embodied therein, the computer-readable program code portions comprising:
an executable portion configured to identify two or more discrete data sets, wherein the two or more discrete data sets comprise at least first data and second data, wherein the first data is unrelated to the second data, and wherein the first data and the second data are real data;
an executable portion configured to apply an integrator to combine the two or more discrete data sets into masked data, wherein the two or more discrete data sets within the masked data have a data type that is the same; and
an executable portion configured to store the masked data in a masked database.

* * * * *